United States Patent
Yamaguchi (10) Patent No.: US 12,311,941 B2
(45) Date of Patent: May 27, 2025

(54) DRIVING SUPPORT APPARATUS, DRIVING SUPPORT METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventor: Yuki Yamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 17/964,395

(22) Filed: Oct. 12, 2022

(65) Prior Publication Data

US 2023/0124903 A1    Apr. 20, 2023

(30) Foreign Application Priority Data

Oct. 14, 2021   (JP) .................. 2021-168854

(51) Int. Cl.
*B60W 30/16*   (2020.01)
*B60W 40/12*   (2012.01)

(52) U.S. Cl.
CPC ............ *B60W 30/16* (2013.01); *B60W 40/12* (2013.01); *B60W 2554/80* (2020.02)

(58) Field of Classification Search
CPC ... B60W 30/16; B60W 40/12; B60W 2554/80
USPC .......................................................... 701/70
See application file for complete search history.

(56) References Cited

U.S. PATENT DOCUMENTS

| | | | | |
|---|---|---|---|---|
| 3,760,841 A | * | 9/1973 | Daffron | B60T 11/34 137/493 |
| 3,768,869 A | * | 10/1973 | Bueler | B60T 8/26 303/9.73 |
| 3,769,997 A | * | 11/1973 | Hardwick | B60T 11/34 303/9.66 |

(Continued)

FOREIGN PATENT DOCUMENTS

| | | |
|---|---|---|
| JP | 11-020498 A | 1/1999 |
| JP | 2013-057992 A | 3/2013 |

OTHER PUBLICATIONS

Virginia Driver's Manual.*

*Primary Examiner* — Kurt Philip Liethen
*Assistant Examiner* — John D Bailey
(74) *Attorney, Agent, or Firm* — Sughrue Mion, PLLC (57) ABSTRACT

Provided is a driving support apparatus including: a surrounding sensor configured to acquire surrounding information on another vehicle present in front of a vehicle and dividing lines extending in front of the vehicle; and a control unit configured to: execute adaptive cruise control (ACC) of, when a preceding vehicle is determined to be present based on the surrounding information, executing acceleration control and deceleration control such that an inter-vehicle distance to the preceding vehicle matches a predetermined target inter-vehicle distance which becomes longer as a vehicle speed increases; and lengthen, when the ACC is started or the ACC is being executed in a case in which a vehicle height is increased to be higher than the normal height by vehicle height adjustment, a target-inter-vehicle-distance-when-stopped, which is the target inter-vehicle distance of when the vehicle is stopped, as compared with a case in which the vehicle height is the normal height.

7 Claims, 9 Drawing Sheets

(56) References Cited

U.S. PATENT DOCUMENTS

| | | | | |
|---|---|---|---|---|
| 3,770,019 | A * | 11/1973 | Stelzer | B60T 13/12 137/627.5 |
| 3,771,836 | A * | 11/1973 | Bueler | B60T 11/34 303/9.66 |
| 6,396,397 | B1 * | 5/2002 | Bos | G01J 1/4204 348/E7.086 |
| 8,954,255 | B1 * | 2/2015 | Crawford | B60W 30/143 701/93 |
| 9,254,846 | B2 * | 2/2016 | Dolgov | G08G 1/22 |
| 10,081,308 | B2 * | 9/2018 | Kuehnle | B60R 11/02 |
| 10,501,059 | B2 * | 12/2019 | Matsuo | G06V 40/103 |
| 10,604,154 | B2 * | 3/2020 | Shin | B60W 30/16 |
| 2004/0016870 | A1 * | 1/2004 | Pawlicki | B62D 15/025 315/77 |
| 2006/0224295 | A1 * | 10/2006 | Tengler | B60W 30/16 180/170 |
| 2009/0069993 | A1 * | 3/2009 | Inoue | B60W 40/06 701/70 |
| 2010/0318272 | A1 * | 12/2010 | Bouchard | B60T 8/1766 701/70 |
| 2011/0101257 | A1 * | 5/2011 | Morris | B60G 17/0525 251/129.01 |
| 2013/0131928 | A1 * | 5/2013 | Bolton | B60R 21/0134 701/1 |
| 2013/0151074 | A1 * | 6/2013 | Takeuchi | B60W 10/06 701/41 |
| 2015/0151600 | A1 * | 6/2015 | Suzuki | B60G 17/0565 280/5.514 |
| 2016/0009280 | A1 * | 1/2016 | Tokimasa | B60W 30/16 701/96 |
| 2016/0009281 | A1 * | 1/2016 | Tokimasa | G01S 13/931 701/96 |
| 2017/0120911 | A1 * | 5/2017 | Shin | B60W 30/16 |
| 2018/0126991 | A1 * | 5/2018 | Endo | B60W 30/165 |
| 2019/0092329 | A1 * | 3/2019 | Masui | G01S 13/867 |
| 2019/0168758 | A1 * | 6/2019 | Matsumoto | B60W 30/16 |
| 2019/0251845 | A1 * | 8/2019 | Kosaka | G08G 1/166 |
| 2019/0293787 | A1 * | 9/2019 | Sakai | G01S 13/867 |
| 2019/0315345 | A1 * | 10/2019 | Newman | B60W 50/14 |
| 2019/0315355 | A1 * | 10/2019 | Tokimasa | B60W 30/14 |
| 2019/0322277 | A1 * | 10/2019 | Kuroki | B60W 30/16 |
| 2019/0329768 | A1 * | 10/2019 | Shalev-Shwartz | G05D 1/617 |
| 2020/0139784 | A1 * | 5/2020 | Sridhar | B60G 21/08 |
| 2020/0369274 | A1 * | 11/2020 | Mizuno | G01S 13/867 |
| 2021/0001850 | A1 * | 1/2021 | Shamshiri | B60W 40/076 |
| 2021/0009113 | A1 * | 1/2021 | Kim | B60W 30/16 |
| 2022/0092319 | A1 * | 3/2022 | Chun | B60W 40/06 |
| 2022/0306168 | A1 * | 9/2022 | Ellis | B61L 15/0058 |
| 2022/0371590 | A1 * | 11/2022 | Busse | B60G 17/0195 |
| 2023/0005374 | A1 * | 1/2023 | Elimaleh | G08G 1/065 |
| 2023/0034858 | A1 * | 2/2023 | Gloceri | B60W 40/1005 |
| 2023/0339455 | A1 * | 10/2023 | Weston | B60W 40/114 |

* cited by examiner

VEHICLE HEIGHT HAS BEEN
ADJUSTED (Δh=15 (cm))

DRIVING SUPPORT APPARATUS, DRIVING SUPPORT METHOD, AND NON-TRANSITORY COMPUTER-READABLE STORAGE MEDIUM

BACKGROUND OF THE INVENTION

1. Field of the Invention

The present invention relates to a driving support apparatus, a driving support method, and a non-transitory computer-readable storage medium, each of which being capable of executing adaptive cruise control.

2. Description of the Related Art

Hitherto, there has been known a driving support apparatus which is mounted to a vehicle, and is capable of executing adaptive cruise control (hereinafter also simply referred to as "ACC"). The ACC is control that executes acceleration control and deceleration control such that, when a preceding vehicle is present, an inter-vehicle distance to the preceding vehicle matches a predetermined target inter-vehicle distance (distance that increases as the speed of the vehicle increases), and executes acceleration control and deceleration control such that, when a preceding vehicle is not present, the speed of the vehicle (vehicle speed) matches a predetermined target vehicle speed. As used herein, "preceding vehicle" refers to a vehicle traveling in an own lane (lane in which the vehicle is currently traveling) in front of the vehicle.

The driving support apparatus includes surrounding sensors (for example, a camera sensor and radar sensors) capable of detecting a three-dimensional object present in front of the vehicle. The inter-vehicle distance to the preceding vehicle is calculated by the surrounding sensors. Specifically, when a preceding vehicle is included in the detected three-dimensional object, the surrounding sensors calculate the distance from the vehicle to a rear end portion of the preceding vehicle as the inter-vehicle distance to the preceding vehicle.

Hitherto, in some cases, a vehicle height is adjusted by raising or lowering a vehicle body by using a suspension for adjusting the vehicle height. Examples of the suspension include a vehicle height adjustment type suspension and an air suspension. For example, the vehicle height adjustment is performed for the purpose of improving the appearance, and when the vehicle height is increased to be higher than the height at a normal time, the vehicle height adjustment may also be performed for the purpose of improving riding comfort on a rough road. As used herein, "height at a normal time" (hereinafter also referred to as "normal height") refers to a height of when the vehicle height adjustment is not performed. In the following, increasing the vehicle height to be higher than the normal height is also simply referred to as "increasing the vehicle height." Further, a state in which the vehicle height has been increased is also referred to as "high-vehicle-height state" or "when the vehicle has a high vehicle height."

In general, the surrounding sensors are mounted (attached) to the vehicle body, and hence, when the vehicle height is adjusted, a mounting height (attachment height) of the surrounding sensors changes. A range in which the surrounding sensors can detect a three-dimensional object (hereinafter also referred to as "detection range") expands in a substantially conical shape as a distance increases from the position of the surrounding sensors to the front. Thus, when the vehicle height is increased and the mounting height of the surrounding sensors becomes higher, the detection range moves upward, with the result that the rear end portion of the preceding vehicle that was able to be detected before the vehicle height adjustment is performed is no longer included in the detection range. In some cases, this can result in a situation in which the surrounding sensors cannot accurately calculate the inter-vehicle distance to the preceding vehicle. In the case of a general vehicle height change amount (strictly speaking, a positive vehicle height change amount) and detection range of the surrounding sensors, the above-mentioned situation occurs when the preceding vehicle is a low-floor vehicle (a vehicle designed such that the height of a cargo bed is relatively low) and the vehicle approaches such a preceding vehicle.

Consequently, in a case in which the vehicle is following a low-floor preceding vehicle by ACC under a high-vehicle-height state, when the target inter-vehicle distance is gradually shortened as the preceding vehicle decelerates, there is a possibility that, during that process, the rear end portion of the preceding vehicle deviates from the detection range of the surrounding sensors and the surrounding sensors can no longer accurately calculate the inter-vehicle distance, and hence ACC is not appropriately executed. Specifically, there is a possibility that, at the point in time at which the surrounding sensors can no longer detect the rear end portion of the preceding vehicle, acceleration control by ACC is executed to cause the vehicle to approach too closely or to collide with the preceding vehicle.

In view of this, there are some driving support apparatuses which are configured such that ACC cannot be used when the vehicle height is increased. With this configuration, the above-mentioned problem can be solved, but another problem occurs in that ACC cannot be used when the vehicle has a high vehicle height.

In Japanese Patent Application Laid-open No. Hei 11-20498, there is described an automatic cruise control apparatus configured to end ACC when an abnormality is detected in, for example, the surrounding sensors or a vehicle speed sensor during execution of ACC.

When the state in which "the rear end portion of the preceding vehicle deviates from the detection range of the surrounding sensors, and the surrounding sensors can no longer detect the rear end portion" is considered to be a surrounding sensor abnormality, the driving support apparatus can be configured like the automatic cruise control apparatus as described in Japanese Patent Application Laid-open No. Hei 11-20498, that is, configured such that ACC is ended at the point in time at which the rear end portion of the preceding vehicle deviates from the detection range of the surrounding sensors. In Japanese Patent Application Laid-open No. Hei 11-20498, ACC and the surrounding sensors are described as "inter-vehicle cruise" and "radar device," respectively.

With the configuration as described in Japanese Patent Application Laid-open No. Hei 11-20498, it is possible to solve the problem that a vehicle approaches too closely or collides with the preceding vehicle through acceleration control by ACC when the vehicle has a high vehicle height, and it is possible to use ACC until the point in time at which at least the rear end portion of the preceding vehicle deviates from the detection range of the surrounding sensors even when the vehicle has a high vehicle height. However, with this configuration, ACC is ended each time the preceding vehicle decelerates (including a case in which the preceding vehicle stops) and the rear end portion of the preceding vehicle deviates from the detection range of the surrounding sensors, and hence a driver of the vehicle is required to perform a driving operation each time ACC ends. This causes another problem in that the convenience of the ACC is impaired.

SUMMARY OF THE INVENTION

The present invention has been made in order to solve the above-mentioned problems. That is, one object of the present invention is to provide a technology capable of appropriately executing ACC even in a case in which a vehicle height is increased to be higher than a normal height.

According to at least one embodiment of the present invention, there is provided a driving support apparatus (hereinafter also referred to as "apparatus of the present invention") including: a surrounding sensor (11) configured to detect another vehicle present in front of a vehicle (V) and dividing lines extending in front of the vehicle, and to acquire information on the detected another vehicle and dividing lines as surrounding information; and a control unit (10) configured to: determine whether a preceding vehicle (Vp) is present based on the surrounding information, and execute adaptive cruise control (ACC) of, when the preceding vehicle is determined to be present, executing acceleration control and deceleration control such that an inter-vehicle distance (d) to the preceding vehicle matches a predetermined target inter-vehicle distance (dtgt) which becomes longer as a speed of the vehicle increases, and when the preceding vehicle is determined to be absent, executing acceleration control and deceleration control such that the speed (v) of the vehicle matches a predetermined target vehicle speed; and lengthen, when the adaptive cruise control is started or when the adaptive cruise control is being executed in a case in which a vehicle height of the vehicle is increased to be higher than a normal height (hn) by vehicle height adjustment, a target-inter-vehicle-distance-when-stopped (dtgts), which is the target inter-vehicle distance of when the vehicle is stopped, as compared with a case in which the vehicle height is the normal height.

In the apparatus of the present invention, in the case in which the vehicle height of the vehicle is increased to be higher than the normal height by vehicle height adjustment, the target-inter-vehicle-distance-when-stopped for adaptive cruise control (ACC) is lengthened as compared with the case in which the vehicle height is the normal height. With this configuration, even when the detection range of the surrounding sensor moves upward due to the vehicle height becoming higher than the normal height, the rear end portion of the preceding vehicle is less liable to deviate from the detection range of the surrounding sensor in the process of the vehicle decelerating and stopping due to the preceding vehicle (including a low-floor vehicle) stopping. Thus, the inter-vehicle distance to the preceding vehicle can be calculated appropriately, and as a result, ACC can be appropriately executed even in the case in which the vehicle height is increased to be higher than the normal height.

In at least one aspect of the present invention, the control unit (10) is configured to: acquire a vehicle height change amount ($\Delta h$), which is an amount of change in the vehicle height at a time of changing the vehicle height from the normal height (hn) by the vehicle height adjustment; and lengthen, when the vehicle height change amount at a time of increasing the vehicle height to be higher than the normal height is defined as a positive value, and the vehicle height change amount at a time of decreasing the vehicle height to be lower than the normal height is defined as a negative value, the target-inter-vehicle-distance-when-stopped (dtgts) as the vehicle height change amount increases.

The detection range of the surrounding sensor moves upward as the vehicle height change amount increases. Thus, the inter-vehicle distance to the preceding vehicle at the point in time at which the rear end portion of the preceding vehicle deviates from the detection range of the surrounding sensor increases together with the increase in the vehicle height change amount. Accordingly, through lengthening of the target-inter-vehicle-distance-when-stopped as the vehicle height change amount increases, the rear end portion of the preceding vehicle is less liable to deviate from the detection range of the surrounding sensor even when the vehicle height change amount becomes larger. As a result, ACC can be appropriately executed even when the vehicle height change amount becomes larger.

In this case, the control unit (10) is configured to maintain a proportional relationship between the vehicle height change amount ($\Delta h$) having a positive value and an amount of increase in the target-inter-vehicle-distance-when-stopped (dtgts).

The inter-vehicle distance to the preceding vehicle at the point in time at which the rear end portion of the preceding vehicle deviates from the detection range of the surrounding sensor increases linearly together with the increase in the vehicle height change amount. Thus, through maintaining of the proportional relationship between the vehicle height change amount having a positive value and the amount of increase in the target-inter-vehicle-distance-when-stopped, the target-inter-vehicle-distance-when-stopped can be suppressed from becoming excessively short or long, and can be set to an appropriate value corresponding to the vehicle height change amount.

In at least one aspect of the present invention, the control unit (10) is configured to avoid executing the adaptive cruise control when the vehicle height change amount ($\Delta h$) having a positive value is equal to or more than a predetermined permission threshold value (hth).

With this configuration, through setting of the permission threshold value appropriately, it is possible to reduce the possibility of the inter-vehicle distance to the preceding vehicle becoming so long that the occupant of the vehicle feels uncomfortable, or becoming so long that another vehicle may enter (cut in) between the vehicle and the preceding vehicle.

In at least one aspect of the present invention, the control unit (10) is configured to maintain the target-inter-vehicle-distance-when-stopped (dtgts) of when the vehicle height change amount ($\Delta h$) is zero or less at the target-inter-vehicle-distance-when-stopped of when the vehicle height is the normal height (hn).

When the vehicle height becomes lower than the normal height and the detection range of the surrounding sensor moves downward, the possibility of the rear end portion of the preceding vehicle (including a low-floor vehicle) deviating from the detection range becomes extremely low.

Consequently, with the configuration described above, the inter-vehicle distance to the preceding vehicle can be maintained appropriately.

According to at least one embodiment of the present invention, there is provided a driving support method including: detecting another vehicle present in front of a vehicle (V) and dividing lines extending in front of the vehicle, and acquiring information on the detected another vehicle and dividing lines as surrounding information; determining whether a preceding vehicle (Vp) is present based on the surrounding information, and executing adaptive cruise control (ACC) of, when the preceding vehicle is determined to be present, executing acceleration control and deceleration control such that an inter-vehicle distance (d) to the preceding vehicle matches a predetermined target inter-vehicle distance (dtgt) which becomes longer as a speed of the vehicle increases, and when the preceding vehicle is determined to be absent, executing acceleration control and deceleration control such that the speed (v) of the vehicle matches a predetermined target vehicle speed; and lengthening, when the adaptive cruise control is started or when the adaptive cruise control is being executed in a case in which a vehicle height of the vehicle is increased to be higher than a normal height (hn) by vehicle height adjustment, a target-inter-vehicle-distance-when-stopped (dtgts), which is the target inter-vehicle distance of when the vehicle is stopped, as compared with a case in which the vehicle height is the normal height.

According to the above-mentioned driving support method, ACC can be appropriately executed even in the case in which the vehicle height is increased to be higher than the normal height.

According to at least one embodiment of the present invention, there is provided a non-transitory computer-readable storage medium storing a driving support program for causing a computer to execute processing of: detecting another vehicle present in front of a vehicle (V) and dividing lines extending in front of the vehicle, and acquiring information on the detected another vehicle and dividing lines as surrounding information; determining whether a preceding vehicle (Vp) is present based on the surrounding information, and executing adaptive cruise control (ACC) of, when the preceding vehicle is determined to be present, executing acceleration control and deceleration control such that an inter-vehicle distance (d) to the preceding vehicle matches a predetermined target inter-vehicle distance (dtgt) which becomes longer as a speed of the vehicle increases, and when the preceding vehicle is determined to be absent, executing acceleration control and deceleration control such that the speed (v) of the vehicle matches a predetermined target vehicle speed; and lengthening, when the adaptive cruise control is started or when the adaptive cruise control is being executed in a case in which a vehicle height of the vehicle is increased to be higher than a normal height (hn) by vehicle height adjustment, a target-inter-vehicle-distance-when-stopped (dtgts), which is the target inter-vehicle distance of when the vehicle is stopped, as compared with a case in which the vehicle height is the normal height.

When the computer is caused to execute the above-mentioned driving support program stored in this storage medium, ACC can be appropriately executed even in the case in which the vehicle height is increased to be higher than the normal height.

In the description above, in order to facilitate understanding of the invention, reference symbols used in at least one embodiment of the present invention are enclosed in parentheses, and are assigned to each of constituent features of the invention corresponding to the at least one embodiment. However, each of the constituent features of the invention is not limited to the at least one embodiment prescribed by the reference symbols.

DESCRIPTION OF THE EMBODIMENTS

First Embodiment

Configuration

Figure 1:
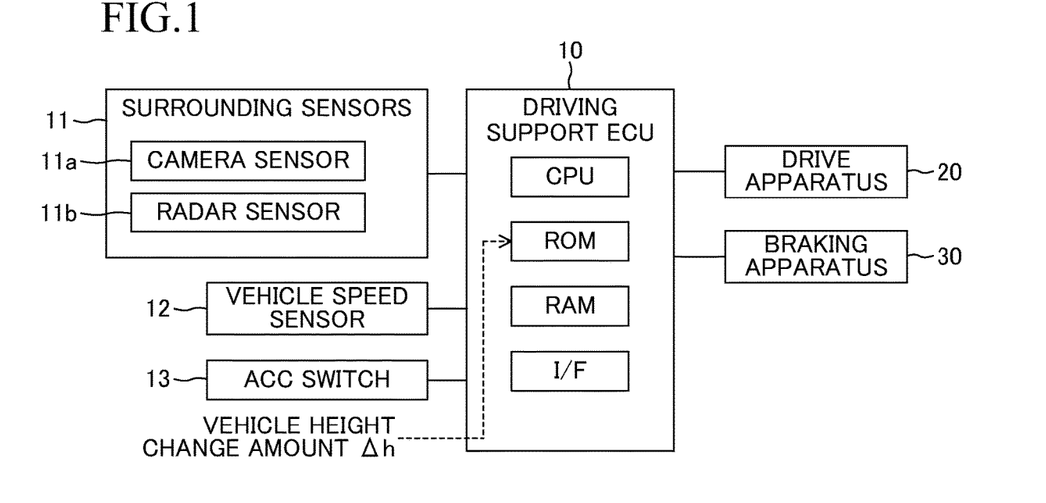
FIG. 1 is a schematic configuration diagram of a driving support apparatus (apparatus of a first embodiment) according to a first embodiment of the present invention.

Description is now given of a driving support apparatus according to a first embodiment (hereinafter also referred to as "apparatus of the first embodiment") of the present invention with reference to the drawings. As illustrated in FIG. 1, the apparatus of the first embodiment includes a driving support ECU 10, and surrounding sensors 11, a vehicle speed sensor 12, an ACC switch 13, a drive apparatus 20, and a braking apparatus 30, each of which being connected to the driving support ECU 10. The driving support ECU 10 includes a microcomputer as a principal component. The ECU is an abbreviation for "electronic control unit." The microcomputer includes, for example, a CPU, a ROM, a RAM, and an interface (I/F), and the CPU is configured to execute instructions (programs and routines) stored in the ROM to achieve various functions. A vehicle to which the apparatus of the first embodiment is mounted is hereinafter referred to as "own vehicle."

The driving support ECU 10 is configured to acquire signals output or generated by the sensors and switches 11 to 13 each time a predetermined time elapses, and to execute ACC by controlling the drive apparatus 20 and the braking apparatus 30 based on the acquired signals. The driving support ECU 10 is hereinafter also simply referred to as "ECU 10."

Figure 2:
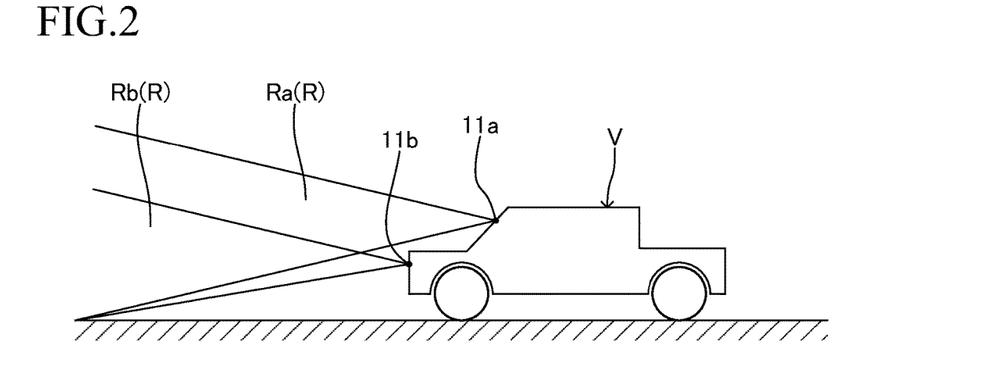
FIG. 2 is a diagram for illustrating mounting positions and a detection range of surrounding sensors.

The surrounding sensors 11 include a camera sensor 11a and radar sensors 11b. As illustrated in FIG. 2, the camera sensor 11a is installed on a back surface of an inner mirror (rear-view mirror) of an own vehicle V. The camera sensor 11a captures images of the landscape in front of the own vehicle V (specifically, from directly in front to diagonally in front), and more specifically, the landscape in a range Ra expanding in a substantially conical shape as a distance increases from the position of the camera sensor 11a to the front. The camera sensor 11a recognizes (detects) a three-dimensional object (for example, another vehicle) present in front of the own vehicle V based on the captured image data, and calculates a relative relationship between the own vehicle V and the three-dimensional object. The "relative relationship between the own vehicle V and the three-dimensional object" includes, for example, a distance from the own vehicle V to the three-dimensional object, and a direction (orientation) and relative speed of the three-dimensional object with respect to the own vehicle V. The range Ra is a range in which a three-dimensional object is detected by the camera sensor 11a, and hence the range Ra is hereinafter also referred to as "camera detection range Ra."

In addition, the camera sensor 11a recognizes (detects) dividing lines extending in front of the own vehicle V based on the image data. A dividing line is a line marked on a road to separate a passage of vehicles by direction. The camera sensor calculates the shape of a lane based on the recognized dividing lines. The term "lane" is defined as an area between two adjacent dividing lines extending along a roadway. The camera sensor can recognize at least the dividing lines forming an own lane (lane in which the own vehicle V is currently traveling).

The radar sensor 11b is installed at each of left and right corners of a front bumper of the own vehicle V. The radar sensors 11b irradiate radio waves in a millimeter wave band from in front of the own vehicle V to the sides of the own vehicle V, more specifically, in a range Rb expanding in a substantially conical shape as a distance increases from the position of the radar sensors 11b to the front. When a three-dimensional object (for example, another vehicle) is present, the radar sensors 11b receive reflected waves from the three-dimensional object. The radar sensors 11b recognize (detect) a three-dimensional object present around the own vehicle V based on, for example, the irradiation timing and reception timing of the radio waves, and calculate the relative relationship between the own vehicle V and the three-dimensional object. The range Rb is a range in which a three-dimensional object is detected by the radar sensors 11b, and hence the range Rb is hereinafter also referred to as "radar detection range Rb."

The surrounding sensors 11 acquire "information on the three-dimensional object detected in at least one of the camera detection range Ra or the radar detection range Rb" and "information on the dividing lines detected in the camera detection range Ra" as surrounding information, and output the acquired surrounding information to the ECU 10. As is clear from the above description, ranges in which the surrounding sensors 11 can detect a three-dimensional object are the ranges defined by the camera detection range Ra and the radar detection range Rb. Thus, in the following, the ranges defined in this way may be collectively referred to as "detection range R."

Returning to FIG. 1 to continue the description, the vehicle speed sensor 12 generates a signal corresponding to a speed (vehicle speed) "v" of the own vehicle. The ECU 10 acquires the signal generated by the vehicle speed sensor 12, and calculates the vehicle speed based on the signal.

The ACC switch 13 is arranged near a driver's seat, and can be operated by a driver of the own vehicle. When the ACC switch 13 is turned on, an ACC request signal is transmitted to the ECU 10. When the ECU 10 receives the ACC request signal, the ECU 10 starts ACC. In the first embodiment, when a preceding vehicle is present, the ECU 10 is configured to set a target inter-vehicle distance dtgt such that a value obtained by dividing the target inter-vehicle distance dtgt by the vehicle speed "v" (strictly speaking, the current vehicle speed "v") becomes constant (in other words, is configured such that the target inter-vehicle distance dtgt increases linearly together with the increase in the vehicle speed "v"). In addition, the ECU 10 is configured to stop the own vehicle at a predetermined distance from the preceding vehicle. For convenience of description, the value obtained by dividing the target inter-vehicle distance dtgt by the vehicle speed "v" is hereinafter defined as "inter-vehicle time T." Moreover, a target inter-vehicle distance dtgt of when the vehicle speed v=0 (km/h) is particularly referred to as "target-inter-vehicle-distance-when-stopped dtgts." With this configuration, the target inter-vehicle distance dtgt can be defined as a linear function of the vehicle speed "v". A slope of the target inter-vehicle distance dtgt is the inter-vehicle time T, and an intercept is the target-inter-vehicle-distance-when-stopped dtgts.

The drive apparatus 20 is an apparatus for applying, to drive wheels of the own vehicle, a driving force for causing the own vehicle to travel. The ECU 10 executes acceleration control for controlling the driving force applied to the drive wheels by controlling operation of the drive apparatus 20.

The braking apparatus 30 is an apparatus for applying, to wheels of the own vehicle, a braking force for braking the own vehicle. The ECU 10 executes deceleration control for controlling the braking force applied to the wheels by controlling operation of the braking apparatus 30.

Figure 3:
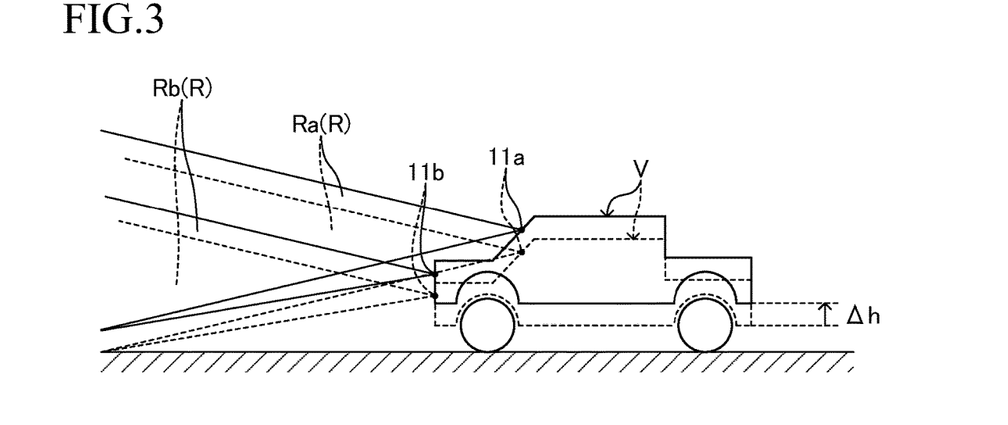
FIG. 3 is a diagram for illustrating the detection range of the surrounding sensors of when a vehicle height is increased to be higher than a normal height.

For the own vehicle, it is possible to adjust a vehicle height by raising or lowering a vehicle body by using a suspension for adjusting the vehicle height. In the first embodiment, vehicle height adjustment is performed at a factory or an authorized dealer by using a well-known vehicle height adjustment type suspension. In FIG. 3, a state in which the vehicle height of the own vehicle V is increased by Δh from a normal height hn by vehicle height adjustment is illustrated. Note that, Δh is a vehicle height change amount at a time of changing the vehicle height from the normal height hn by vehicle height adjustment, and hence Δh is hereinafter referred to as "vehicle height change amount Δh." In the present specification, the vehicle height change amount Δh at a time of increasing the vehicle height to be higher than the normal height hn (see FIG. 3) is defined as a positive value, and the vehicle height change amount Δh at a time of decreasing the vehicle height to be lower than the normal height hn is defined as a negative value.

The factory or authorized dealer has equipment which can transmit a command including the vehicle height change amount Δh to the ECU 10. Thus, when the vehicle height adjustment is complete, an operator transmits a command including the vehicle height change amount Δh to the ECU 10 (see FIG. 1). As a result, an accurate value of the vehicle height change amount Δh is written in the ROM of the ECU 10.

Details of Operation

Next, the details of the operation of the ECU 10 are described, but before that, detrimental effects on ACC caused by increasing the vehicle height are described first. As illustrated in FIG. 3, when the vehicle height of the own vehicle V is increased, the mounting height of each of the camera sensor 11a and radar sensors 11b becomes higher, and the camera detection range Ra and the radar detection range Rb each move upward (see the solid lines). When the detection range R moves upward, a situation can occur in which the rear end portion of the preceding vehicle that was able to be detected before vehicle height adjustment is no longer included in the detection range, and the surrounding sensors 11 can no longer accurately calculate the inter-vehicle distance to the preceding vehicle. In this case, the ECU 10 may not appropriately execute ACC.

Figure 11:
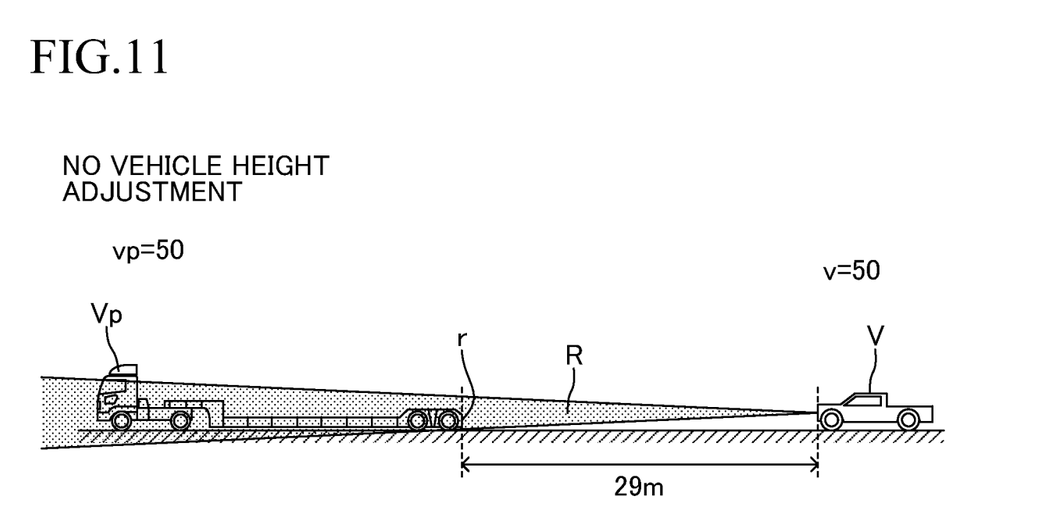
FIG. 11 is a diagram for illustrating a positional relationship between an own vehicle and a preceding vehicle and the detection range of the surrounding sensors of when the own vehicle is following the preceding vehicle by ACC in a case in which the vehicle height has not been adjusted.
Figure 12:
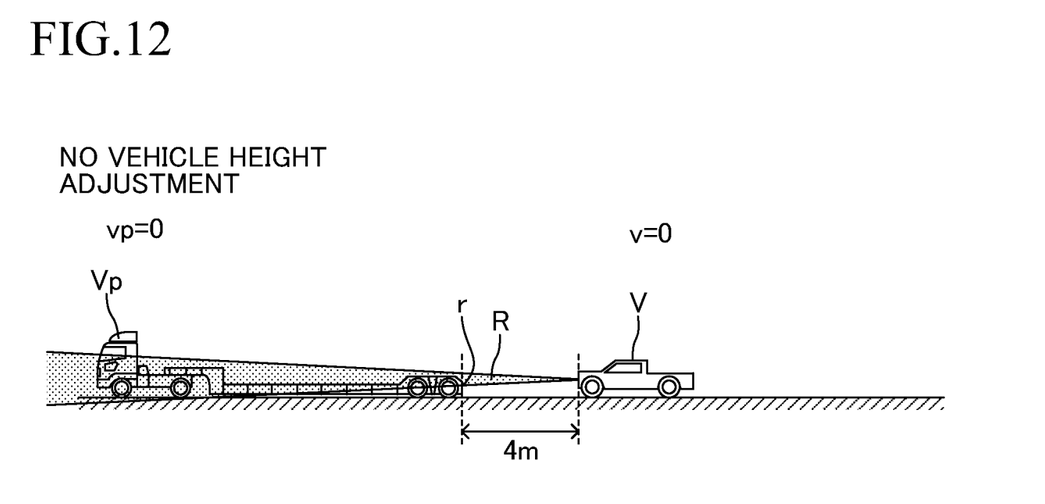
FIG. 12 is a diagram for illustrating the positional relationship between the own vehicle and the preceding vehicle and the detection range of the surrounding sensors of when the own vehicle stops due to the preceding vehicle stopping in the example of FIG. 11.
Figure 13:
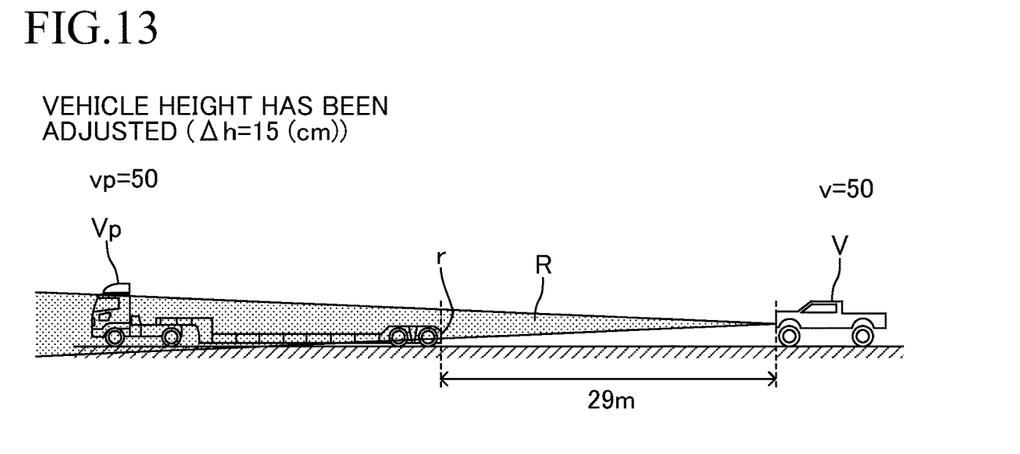
FIG. 13 is a diagram for illustrating, as a comparative example, a positional relationship between the own vehicle and the preceding vehicle and the detection range of the surrounding sensors of when the own vehicle is following the preceding vehicle by ACC in a case in which the vehicle height has been increased by vehicle height adjustment.
Figure 14:
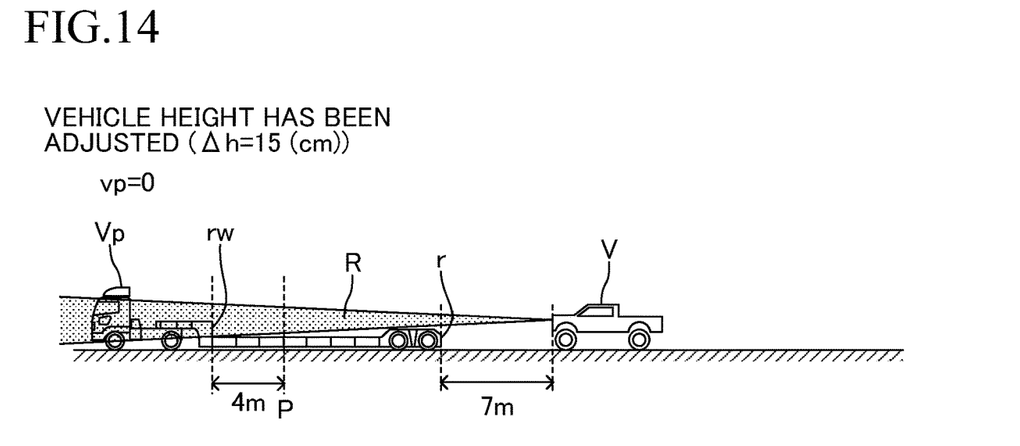
FIG. 14 is a diagram for illustrating a state in which a rear end portion of the preceding vehicle has deviated from the detection range of the surrounding sensors in the process of the own vehicle decelerating due to the preceding vehicle stopping in the example of FIG. 13.
Figure 15:
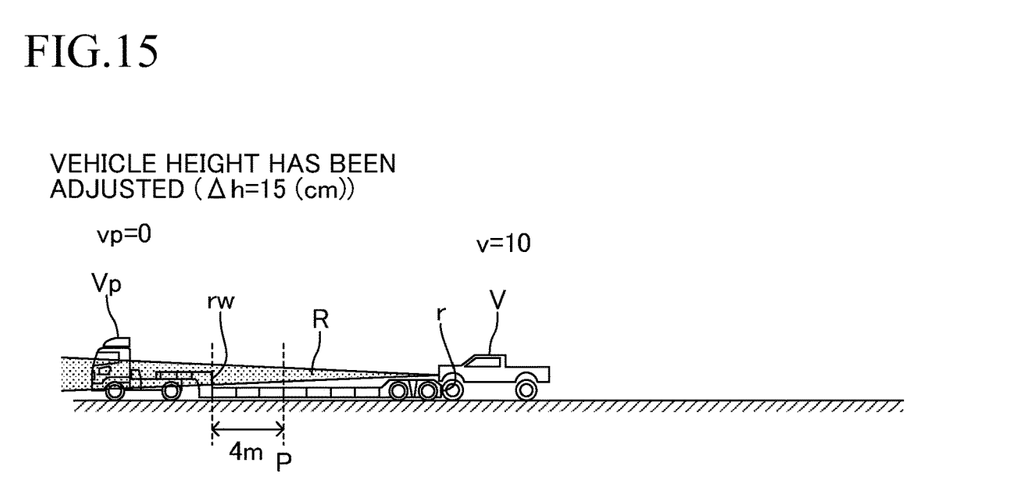
FIG. 15 is a diagram for illustrating a state in which acceleration control by ACC is performed in the example of FIG. 14 and the own vehicle collides with the preceding vehicle.

A specific description is now given with reference to FIG. 11 to FIG. 15. In all of FIG. 11 to FIG. 15, a situation in which the own vehicle V is traveling by ACC or has been stopped by ACC is illustrated. A preceding vehicle Vp is a low-floor vehicle. In this example, the target-inter-vehicle-distance-when-stopped dtgts is set to 4 (m), and the inter-vehicle time T is set to 1.8 (s). In FIG. 11 and FIG. 12, the height of the own vehicle V has not been adjusted, and the own vehicle V is traveling at the normal vehicle height hn. Meanwhile, the own vehicle V illustrated in FIG. 13 to FIG. 15 is traveling at a vehicle height that is increased to be higher than the normal height hn by the vehicle height change amount Δh=15 (cm) by vehicle height adjustment.

First, a case in which the vehicle height is not adjusted is described with reference to FIG. 11 and FIG. 12. In FIG. 11, the preceding vehicle Vp is traveling at a constant vehicle speed vp=50 (km/h). In this case, the ECU 10 sets the target inter-vehicle distance dtgt to 29 (m) and executes acceleration control and deceleration control such that the vehicle speed "v" is 50 (km/h). As described above, when the target inter-vehicle distance dtgt is relatively long, even when the preceding vehicle Vp is a low-floor vehicle, the rear end portion "r" is included in the detection range R of the surrounding sensors 11. Consequently, the surrounding sensors 11 can appropriately detect the rear end portion "r", and as a result, can appropriately calculate the inter-vehicle distance "d" to the preceding vehicle Vp. Accordingly, in the example of FIG. 11, the own vehicle V is traveling at the vehicle speed v=50 (km/h) while maintaining the inter-vehicle distance d=29 (m), and the inter-vehicle time T is maintained at 1.8 (s). The detection range R of FIG. 11 represents the theoretical detection range of the surrounding sensors 11. Thus, the portion of the detection range R below the road surface is not included in the actual detection range. This also applies to FIG. 12 to FIG. 15.

When the preceding vehicle Vp starts to decelerate while traveling, the ECU 10 decelerates the own vehicle V and reduces the target inter-vehicle distance dtgt in order to maintain the inter-vehicle time T at 1.8 (s). Further, as illustrated in FIG. 12, when the preceding vehicle Vp stops, the ECU 10 stops the own vehicle V such that the inter-vehicle distance "d" becomes 4 (m) (target-inter-vehicle-distance-when-stopped dtgts). The height of the own vehicle V has not been adjusted, and hence the surrounding sensors 11 can appropriately calculate the inter-vehicle distance "d" to the preceding vehicle Vp without the rear end portion "r" of the preceding vehicle Vp deviating from the detection range R during the period from the start of deceleration until stopping. Consequently, in the example of FIG. 12, the own vehicle V appropriately stops at a position at the inter-vehicle distance d=4 (m) from (the rear end portion "r" of) the preceding vehicle Vp.

Next, a case in which the height of the vehicle has been increased by vehicle height adjustment (own vehicle V is in a high-vehicle-height state) is described with reference to FIG. 13 to FIG. 15. In FIG. 13, the preceding vehicle Vp is traveling at a constant vehicle speed vp=50 (km/h). In this case, similarly to FIG. 11, the ECU 10 sets the target inter-vehicle distance dtgt to 29 (m) and executes acceleration control and deceleration control such that the vehicle speed "v" is 50 (km/h). As described above, when the target inter-vehicle distance dtgt is relatively long, even when the preceding vehicle Vp is a low-floor vehicle and the own vehicle V is in the high-vehicle-height state, the rear end portion "r" is included in the detection range R of the surrounding sensors 11. As a result, the surrounding sensors 11 can appropriately calculate the inter-vehicle distance "d" to the preceding vehicle Vp. Consequently, in the example of FIG. 13, the own vehicle V is traveling at the vehicle speed v=50 (km/h) while maintaining the inter-vehicle distance d=29 (m), and the inter-vehicle time T is maintained at 1.8 (s).

As illustrated in FIG. 14, when the preceding vehicle Vp starts to decelerate while traveling and stops, the ECU 10 decelerates the own vehicle V and reduces the target inter-vehicle distance dtgt in order to maintain the inter-vehicle time T at 1.8 (s). As a result, the vehicle speed "v" decreases and the inter-vehicle distance "d" becomes shorter (the own vehicle approaches the preceding vehicle Vp). In the high-vehicle-height state, the detection range R moves upward, and hence, when the preceding vehicle Vp is a low-floor vehicle, the rear end portion "r" of the preceding vehicle Vp deviates from the detection range R in the process of the inter-vehicle distance "d" becoming shorter (inter-vehicle distance "d" can no longer be calculated appropriately). In this case, the surrounding sensors 11 search for a new rear end portion at that point in time. In the example of FIG. 14, at the point in time at which the inter-vehicle distance "d" shortens to 7 (m), the rear end portion "r" deviates from the detection range R, and hence the surrounding sensors 11 detect an end surface rw at that point in time (end surface of the preceding vehicle Vp positioned in front of the end portion "r") as a new rear end portion (hereinafter referred to as "rear end portion rw"). The ECU 10 starts acceleration control by ACC at that point in time in order to stop the own vehicle V at a position P at the target-inter-vehicle-distance-when-stopped dtgts (=4 (m)) from the rear end portion rw. As a result, as illustrated in FIG. 15, the own vehicle V collides with the rear end portion "r" of the preceding vehicle Vp during the execution of the acceleration control (in the example of FIG. 15, when accelerated to vehicle speed v=10 (km/h)).

In this way, when the vehicle height has not been adjusted, even when the preceding vehicle Vp is a low-floor vehicle, ACC can be appropriately executed because the rear end portion "r" of the preceding vehicle Vp does not deviate from the detection range R in the process of the own vehicle V decelerating. In contrast, when the own vehicle V is in the high-vehicle-height state and the preceding vehicle Vp is a low-floor vehicle, the surrounding sensors 11 can no longer detect the rear end portion "r" in the process of the own vehicle V decelerating, and a possibility of a different portion of the preceding vehicle Vp (typically, a portion of the preceding vehicle Vp that is positioned in front of the rear end portion "r") being detected as a new rear end portion rw (that is, the inter-vehicle distance "d" can no longer be calculated appropriately) is increased. As a result, acceleration control by ACC is executed, and there is a possibility that ACC is not executed appropriately with the own vehicle V colliding with the rear end portion "r" of the preceding vehicle Vp (see FIG. 15) or approaching too close.

Figure 4:
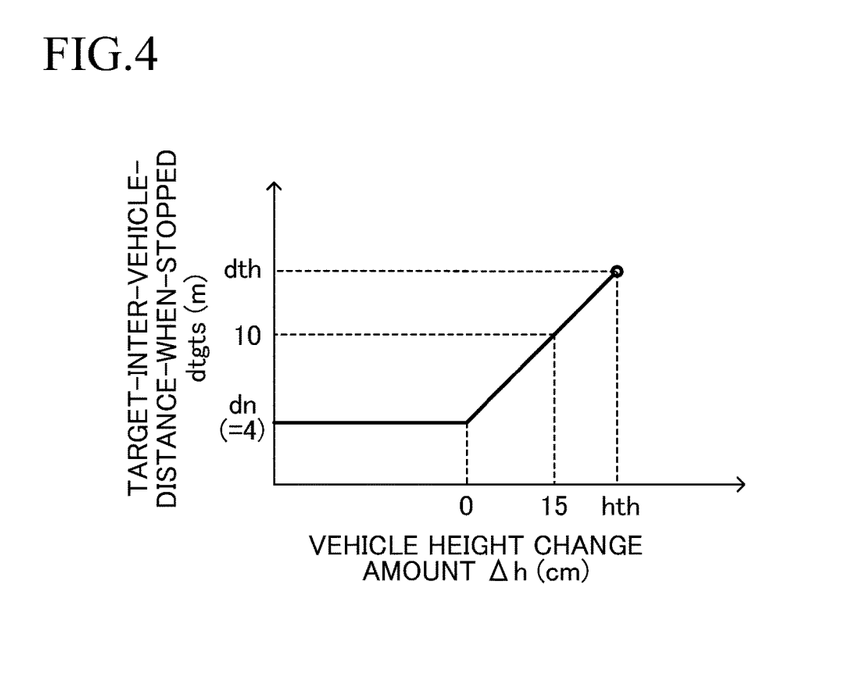
FIG. 4 is a graph for showing a relationship between a vehicle height change amount and a target-inter-vehicle-distance-when-stopped.

In view of the above, the ECU 10 is configured to change the target-inter-vehicle-distance-when-stopped dtgts in accordance with the vehicle height change amount $\Delta h$. FIG. 4 is a graph for showing a relationship between the vehicle height change amount $\Delta h$ (cm) and the target-inter-vehicle-distance-when-stopped dtgts (m). The graph is stored in the ROM of the ECU 10. As shown in FIG. 4, the target-inter-vehicle-distance-when-stopped dtgts is set (maintained) to do when the vehicle height change amount $\Delta h$ is $\Delta h \leq 0$, and increases linearly as $\Delta h$ increases when $0 < \Delta h < hth$ (that is, increases together with the increase in the vehicle height). More specifically, when $0 < \Delta h < hth$, dtgts=dn+C$\Delta h$ (C is a positive constant) is satisfied. In the range of $0 < \Delta h < hth$, the constant C can be determined in advance by experiment or simulation such that the rear end portion "r" is included in the detection range R of the surrounding sensors 11 when the own vehicle V stops at a position at the inter-vehicle distance d=dtgts (strictly speaking, dtgts corresponding to $\Delta h$) from (the rear end portion "r" of) the preceding vehicle Vp, which is a low-floor vehicle of a general size.

Figure 5:
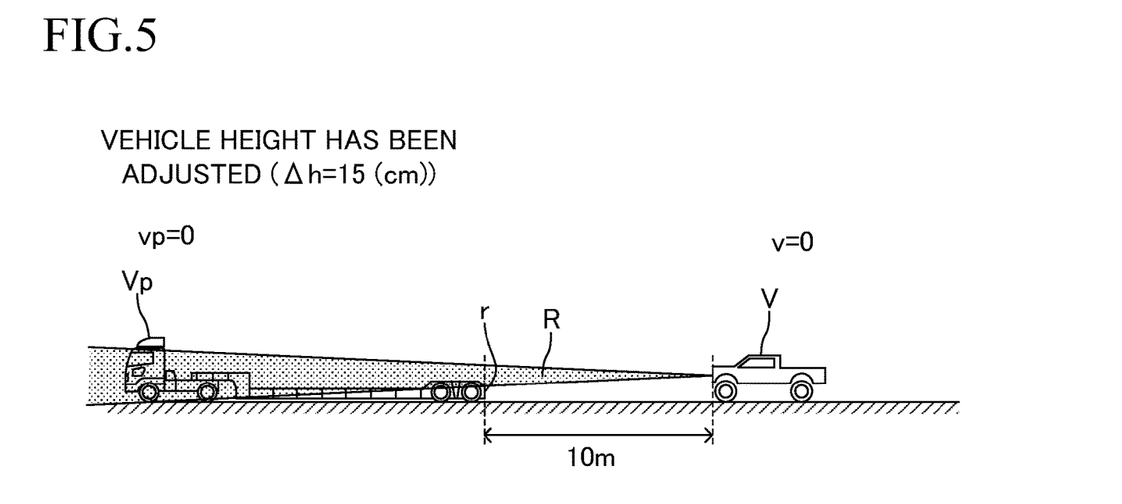
FIG. 5 is a diagram for illustrating a positional relationship between an own vehicle and a preceding vehicle and the detection range of the surrounding sensors of when the own vehicle stops due to the preceding vehicle stopping during execution of ACC in a case in which the target-inter-vehicle-distance-when-stopped has been lengthened in accordance with the vehicle height change amount.

In FIG. 5, a state in which a low-floor preceding vehicle Vp decelerates and stops while the own vehicle V is following the preceding vehicle Vp by ACC is shown. The vehicle height of the own vehicle V is increased by $\Delta h=15$ (cm). In this case, the target-inter-vehicle-distance-when-stopped dtgts is set to 10 (m) (see FIG. 4). In this way, through lengthening of the target-inter-vehicle-distance-when-stopped dtgts from the normal 4 (m) (see FIG. 14 and FIG. 15) to 10 (m), even when the preceding vehicle Vp is a low-floor vehicle, the rear end portion "r" does not deviate from the detection range R in the process of stopping after the own vehicle V starts to decelerate. As a result, the surrounding sensors 11 can appropriately calculate the inter-vehicle distance "d", and the own vehicle V appropriately stops at a position at the inter-vehicle distance d=10 (m) from (the rear end portion "r" of) the preceding vehicle Vp. That is, ACC can be executed appropriately.

In the graph of FIG. 4, a target-inter-vehicle-distance-when-stopped dtgts is not defined when hth≤$\Delta h$. That is, the ECU 10 is configured not to execute (configured to avoid executing) the ACC when hth≤$\Delta h$. In the following, hth is also referred to as "permission threshold value hth." A value of dth, which is the target-inter-vehicle-distance-when-stopped dtgts corresponding to the permission threshold value hth, can be determined in advance by experiment or simulation to be a value such that the an occupant is unlikely to feel uncomfortable even when the own vehicle V stops at a position at the inter-vehicle distance d=dth from the preceding vehicle Vp, and/or such that another vehicle is unlikely to enter (to cut in) between the own vehicle V and the preceding vehicle Vp. The value of hth can be uniquely determined from the value dth and the constant C, each determined in this manner.

When $\Delta h \leq 0$, the target-inter-vehicle-distance-when-stopped dtgts is maintained at dn. This is because in the case in which the vehicle height is lower than the normal height hn and the detection range R moves downward, the rear end portion "r" does not deviate from the detection range R even when the preceding vehicle Vp is a low-floor vehicle, and hence it is not required to change the target-inter-vehicle-distance-when-stopped dtgts.

Figure 6:
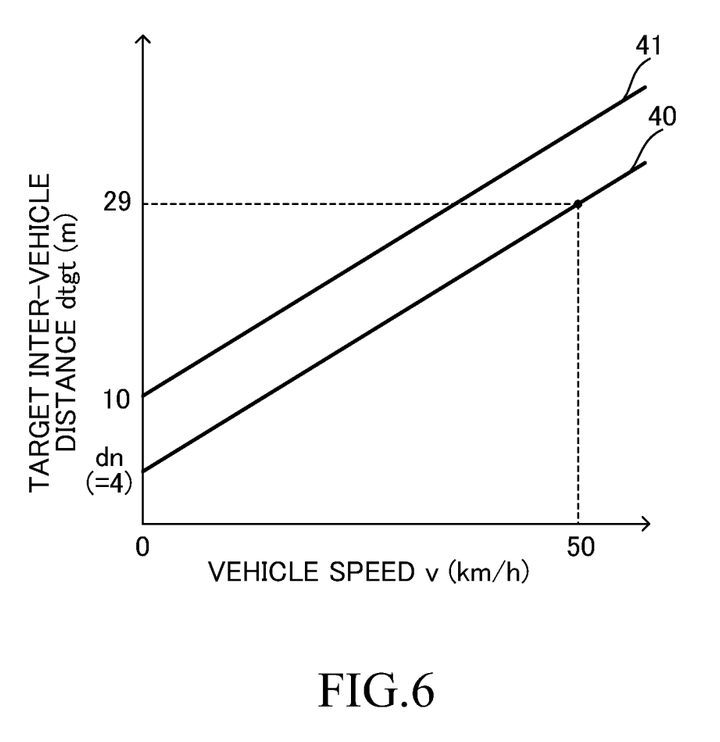
FIG. 6 is a graph for showing a relationship between a vehicle speed and a target inter-vehicle distance.

When the ECU 10 receives the ACC request signal, the ECU 10 reads out the vehicle height change amount $\Delta h$ stored in the ROM, and sets a value corresponding to the vehicle height change amount $\Delta h$ as the target-inter-vehicle-distance-when-stopped dtgts with reference to the graph of FIG. 4. Here, the ECU 10 is configured to maintain the inter-vehicle time T to be constant regardless of the value of the target-inter-vehicle-distance-when-stopped dtgts. FIG. 6 is a graph for showing a relationship between the vehicle speed "v" (km/h) and the target inter-vehicle distance dtgt (m). The target inter-vehicle distance dtgt of when the vehicle speed v=0 corresponds to the target-inter-vehicle-distance-when-stopped dtgts. Straight lines 40 and 41 represent relationship between the vehicle speed "v" and the target inter-vehicle distance dtgt for the vehicle height change amounts $\Delta h \leq 0$ and $\Delta h=15$, respectively. In the graph of FIG. 6, the slopes of the straight lines 40 and 41 are equal to each other. This means that the inter-vehicle times T (slopes of the straight lines 40 and 41) for the vehicle height change amounts $\Delta h \leq 0$ and $\Delta h=15$ are equal to each other (in the first embodiment, the inter-vehicle time T=1.8 (s)). With this configuration, through the lengthening of the target-inter-vehicle-distance-when-stopped dtgts, the target inter-vehicle distance dtgt at any vehicle speed "v" is also lengthened by the same distance. The graph of FIG. 6 shows the relationship between the vehicle speed "v" and the target inter-vehicle distance dtgt (that is, the relationship that the inter-vehicle time T is constant) for the vehicle height change amounts $\Delta h \leq 0$ and $\Delta h=15$. However, the same relationship holds within the range of $0 < \Delta h < hth$.

Specific Operation

Details of the operation of the ECU 10 are now described. The CPU of the ECU 10 is configured to repeatedly execute routines illustrated as flowcharts of FIG. 7 and FIG. 8 in parallel each time a predetermined time elapses during a period in which an ignition switch is at an ON position.

Figure 7:
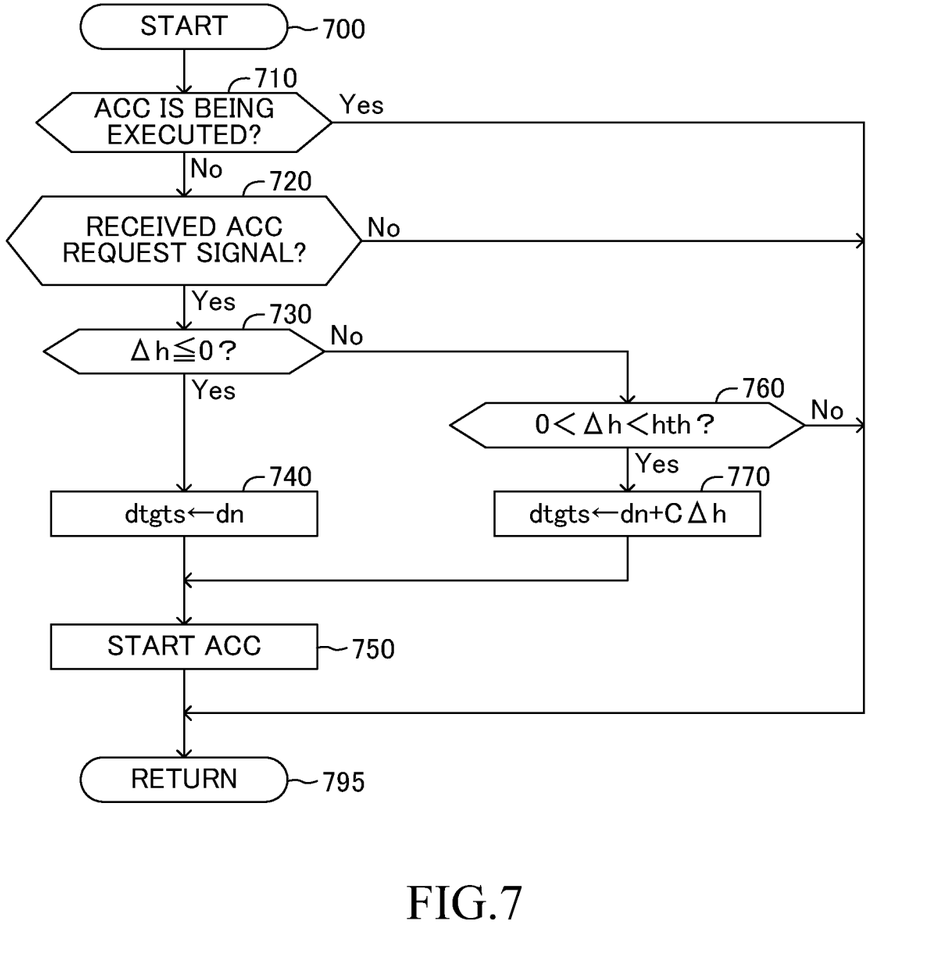
FIG. 7 is a flowchart for illustrating a routine to be executed by a CPU of a driving support ECU of the apparatus of the first embodiment.

At a predetermined timing, the CPU starts processing from Step 700 of FIG. 7, and the process advances to Step 710. Then, the CPU determines whether or not ACC is being executed. When ACC is not being executed ("No" in Step 710), the process advances to Step 720, and the CPU determines whether or not the CPU has received the ACC request signal from the ACC switch 13. When having not received the ACC request signal ("No" in Step 720), the process advances to Step 795, and the CPU temporarily ends this routine. Meanwhile, when having received the ACC request signal ("Yes" in Step 720), the process advances to Step 730.

In Step 730, the CPU reads out the vehicle height change amount $\Delta h$ from the ROM of the ECU 10 and determines whether or not $\Delta h \leq 0$ is satisfied. When $\Delta h \leq 0$ is satisfied ("Yes" in Step 730), the process advances to Step 740, and the CPU sets do as the target-inter-vehicle-distance-when-stopped dtgts (see FIG. 4). Meanwhile, when $\Delta h \leq 0$ is not satisfied ("No" in Step 730), the process advances to Step 760, and the CPU determines whether or not 0<Δh<hth is satisfied. When 0<Δh<hth is not satisfied (that is, hth≤Δh is satisfied) ("No" in Step 760), the process advances to Step 795, and the CPU temporarily ends this routine. That is, ACC is not executed (see FIG. 4).

In contrast, when 0<Δh<hth is satisfied ("Yes" in Step 760), the process advances to Step 770, and the CPU sets dn+CΔh as the target-inter-vehicle-distance-when-stopped dtgts (see FIG. 4). When the processing step of Step 740 or Step 770 is complete, the process advances to Step 750, and the CPU starts ACC. After that, the process advances to Step 795, and the CPU temporarily ends this routine.

Meanwhile, when ACC is being executed ("Yes" in Step 710), the process advances to Step 795 without the CPU executing the processing steps of from Step 720 to Step 750, and the CPU temporarily ends this routine.

Figure 8:
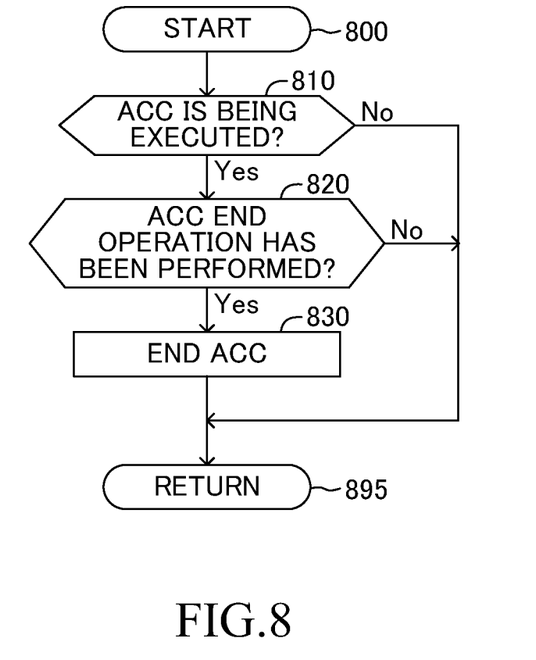
FIG. 8 is a flowchart for illustrating a routine to be executed by the CPU.

In parallel with this, at a predetermined timing, the CPU starts processing from Step 800 of FIG. 8, and the process advances to Step 810. Then, the CPU determines whether or not ACC is being executed. When ACC is not being executed ("No" in Step 810), the process advances to Step 895, and the CPU temporarily ends this routine.

Meanwhile, when ACC is being executed ("Yes" in Step 810), the process advances to Step 820, and the CPU determines whether or not an ACC end operation has been performed. The ACC end operation is an operation executed by the driver in order to end ACC, and includes an acceleration override and a braking operation. The acceleration override means that the requested acceleration based on an accelerator pedal operation by the driver exceeds the acceleration applied by the ACC. When the ACC end operation has not been performed ("No" in Step 820), the process advances to Step 895, and the CPU temporarily ends this routine.

In contrast, when the ACC end operation has been performed ("Yes" in Step 820), the process advances to Step 830, and the CPU ends the ACC. After that, the process advances to Step 895, and the CPU temporarily ends this routine.

As described above, according to the apparatus of the first embodiment, in the case in which the vehicle height is increased to be higher than the normal height hn by the vehicle height adjustment, the target-inter-vehicle-distance-when-stopped dtgts is lengthened to be longer than when the vehicle height is the normal height hn. With this configuration, even when the detection range R of the surrounding sensors 11 moves upward due to the vehicle height becoming higher than the normal height hn, the rear end portion "r" of the preceding vehicle Vp is less liable to deviate from the detection range R in the process of the own vehicle V decelerating and stopping due to the preceding vehicle Vp stopping. Thus, the inter-vehicle distance "d" to the preceding vehicle Vp can be calculated appropriately, and as a result, ACC can be appropriately executed even in the case in which the vehicle height is increased to be higher than the normal height hn.

In particular, in the apparatus of the first embodiment, when the vehicle height change amount Δh is 0<Δh, the vehicle height change amount Δh and the amount of increase in the target-inter-vehicle-distance-when-stopped dtgts are maintained in a proportional relationship. The inter-vehicle distance "d" to the preceding vehicle Vp at the point in time at which the rear end portion "r" of the preceding vehicle Vp deviates from the detection range R of the surrounding sensors 11 increases linearly together with the increase in the vehicle height change amount Δh. Consequently, with this configuration, the target-inter-vehicle-distance-when-stopped dtgts can be suppressed from becoming excessively short or long, and can be set to an appropriate value corresponding to the vehicle height change amount Δh.

Second Embodiment

Next, a driving support apparatus according to a second embodiment of the present invention (hereinafter also referred to as "apparatus of the second embodiment") is described with reference to the drawings. The second embodiment is different from the first embodiment in that the suspension used for vehicle height adjustment is an air suspension. In the following, the differences of the apparatus of the second embodiment from the apparatus of the first embodiment are mainly described. Further, the same reference symbols and step numbers are used for the same configurations and processing as those of the apparatus of the first embodiment.

Figure 9:
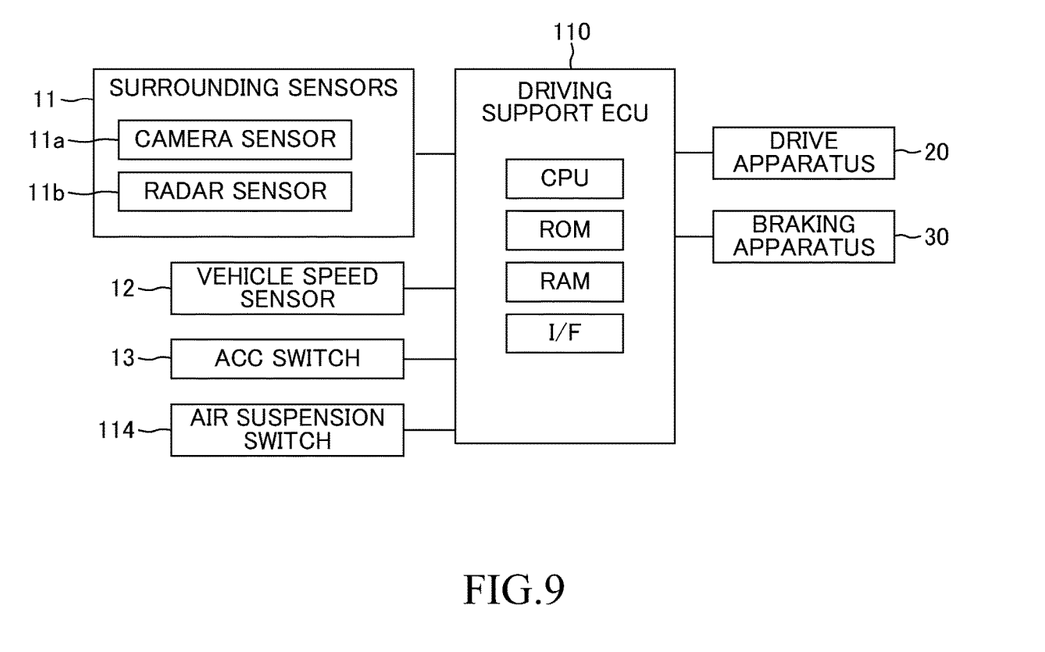
FIG. 9 is a schematic configuration diagram of a driving support apparatus (apparatus of a second embodiment) according to a second embodiment of the present invention.

As illustrated in FIG. 9, the apparatus of the second embodiment includes a driving support ECU 110, and surrounding sensors 11, the vehicle speed sensor 12, the ACC switch 13, an air suspension switch 114, the drive apparatus 20, and the braking apparatus 30, which are connected to the driving support ECU 110.

The air suspension switch 114 is arranged near the driver's seat, and can be operated by the driver. The air suspension switch 114 includes an ascending switch and a descending switch (not shown). When the ascending switch or descending switch is pressed, a pressing signal including the number of presses is transmitted to the ECU 110. When the ECU 110 receives the pressing signal, the ECU 110 performs vehicle height adjustment corresponding to the number of presses by supplying compressed air to an air spring (member arranged between a vehicle body and an axle) (not shown) or discharging compressed air from the air spring. The vehicle height adjustment can be executed at any time during a period in which the ignition switch is at the on position. When the vehicle height adjustment is complete, the ECU 110 stores the value of the vehicle height change amount Δh in the ROM.

Specific Operation

Figure 10:
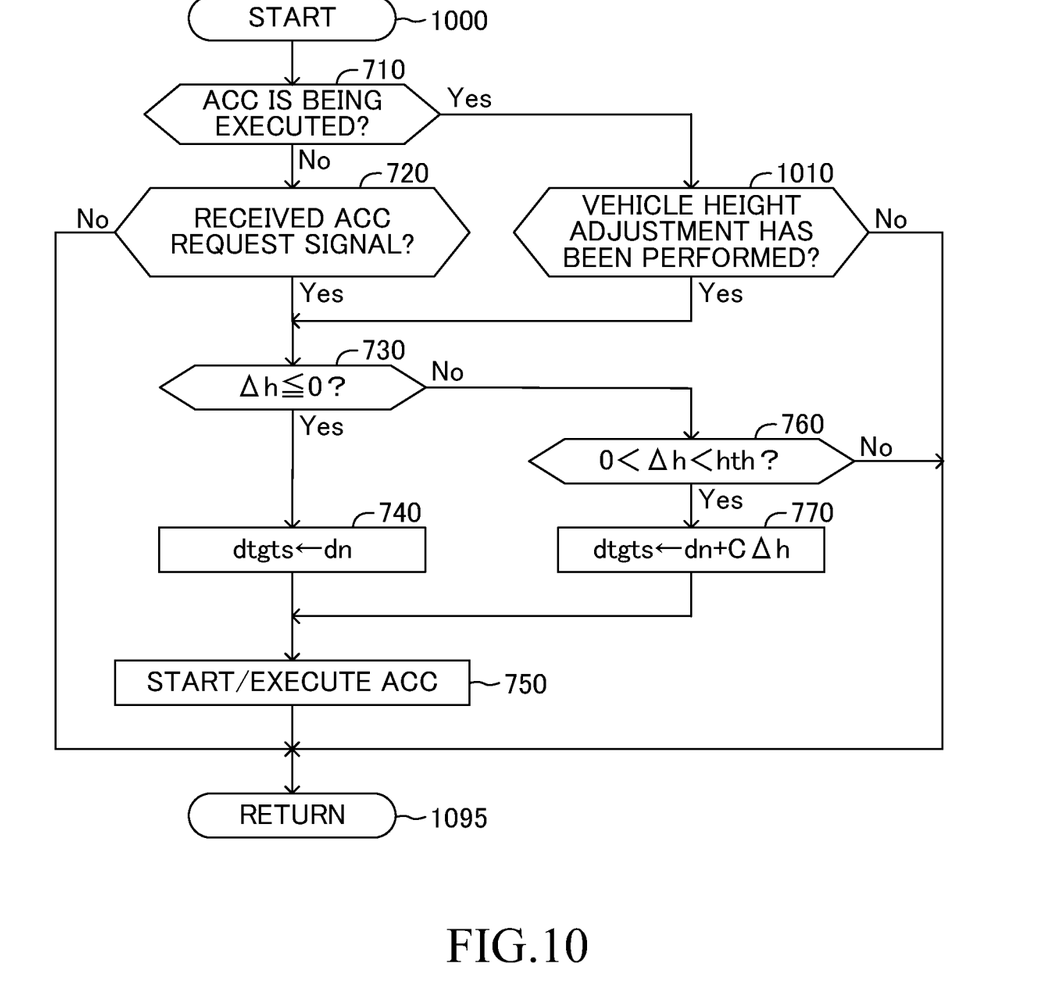
FIG. 10 is a flowchart for illustrating a routine to be executed by a CPU of a driving support ECU of the apparatus of the second embodiment.

A CPU of the ECU 10 is configured to repeatedly execute routines illustrated as flowcharts of FIG. 10 and FIG. 8 in parallel each time a predetermined time elapses during a period in which the ignition switch is at the ON position. In the following, regarding the routine of FIG. 10, only the processing steps different from those of FIG. 7 are described.

At a predetermined timing, the CPU starts processing from Step 1000 of FIG. 10, and the process advances to Step 710. When it is determined in Step 710 that ACC is being executed ("Yes" in Step 710), the process advances to Step 1010, and the CPU determines whether or not vehicle height adjustment has been performed at the current time. When vehicle height adjustment has not been performed ("No" in Step 1010), the process advances to Step 1095, and the CPU temporarily ends this routine. Meanwhile, when vehicle height adjustment has been performed ("Yes" in Step 1010), the CPU executes the processing steps of from Step 730 to Step 770 (more specifically, the CPU executes ACC in Step 750). Then, the process advances to Step 1095, and the CPU temporarily ends this routine.

The apparatus of the second embodiment can also exert the same action and effect as those of the apparatus of the first embodiment. In the apparatus of the second embodiment, vehicle height adjustment is possible even during driving. Thus, when the vehicle is stopped, it is desired that the own vehicle V not be moved back even when the vehicle height is increased by vehicle height adjustment and the target-inter-vehicle-distance-when-stopped dtgts becomes longer.

In the above, the driving support apparatus, the driving support method, and the non-transitory computer-readable storage medium according to the embodiments have been described, but the present invention is not limited to the above-mentioned embodiments, and various changes are possible within the range not departing from the object of the present invention. Moreover, the present invention can also be applied to a vehicle traveling by autonomous driving (by autonomous driving control).

What is claimed is:

1. A driving support apparatus, comprising:
    a surrounding sensor configured to detect a preceding vehicle present in front of an own vehicle and dividing lines extending in front of the own vehicle, and to acquire information on the preceding vehicle and the dividing lines as surrounding information; and
    a control unit configured to:
        determine whether the preceding vehicle is present based on the surrounding information,
        execute, when the preceding vehicle is determined to be present, adaptive cruise control of accelerating and decelerating the own vehicle such that an inter-vehicle distance to the preceding vehicle matches a predetermined target inter-vehicle distance which becomes longer as a speed of the own vehicle increases, and
        execute, when the preceding vehicle is determined to be absent, the adaptive cruise control of accelerating and decelerating the own vehicle such that the speed of the own vehicle matches a predetermined target vehicle speed;
        lengthen, when the adaptive cruise control is started or when the adaptive cruise control is being executed in a case in which a vehicle height of the own vehicle is increased to be higher than a normal height by vehicle height adjustment, a target-inter-vehicle-distance-when-stopped, which is the target inter-vehicle distance of when the own vehicle is stopped, as compared with a case in which the vehicle height is the normal height;
        acquire a vehicle height change amount, which is an amount of change in the vehicle height at a time of changing the vehicle height from the normal height by the vehicle height adjustment;
        when the vehicle height change amount at a time of increasing the vehicle height to be higher than the normal height is defined as a positive value, and the vehicle height change amount at a time of decreasing the vehicle height to be lower than the normal height is defined as a negative value, lengthen the target-inter-vehicle-distance-when-stopped as the vehicle height change amount increases; and
        execute the adaptive cruise control of accelerating and decelerating the own vehicle by controlling a driving force applied to a drive apparatus of the own vehicle and controlling a braking force applied to a braking apparatus of the own vehicle, such that the inter-vehicle distance to the preceding vehicle matches the target-inter-vehicle-distance-when-stopped.

2. The driving support apparatus according to claim 1, wherein the control unit is configured to maintain a proportional relationship between the vehicle height change amount having a positive value and an amount of increase in the target-inter-vehicle-distance-when-stopped.

3. The driving support apparatus according to claim 2, wherein the control unit is configured to avoid executing the adaptive cruise control of the own vehicle when the vehicle height change amount having a positive value is equal to or more than a predetermined permission threshold value.

4. The driving support apparatus according to claim 1, wherein the control unit is configured to avoid executing the adaptive cruise control of the own vehicle when the vehicle height change amount having a positive value is equal to or more than a predetermined permission threshold value.

5. The driving support apparatus according to claim 1, wherein the control unit is configured to maintain the target-inter-vehicle-distance-when-stopped of when the vehicle height change amount is zero or less at the target-inter-vehicle-distance-when-stopped of when the vehicle height is the normal height.

6. A driving support method, comprising:
    detecting a preceding vehicle present in front of an own vehicle and dividing lines extending in front of the own vehicle, and acquiring information on the preceding vehicle and the dividing lines as surrounding information;
    determining whether the preceding vehicle is present based on the surrounding information,
    executing, when the preceding vehicle is determined to be present, adaptive cruise control of accelerating and decelerating the own vehicle such that an inter-vehicle distance to the preceding vehicle matches a predetermined target inter-vehicle distance which becomes longer as a speed of the own vehicle increases,
    executing, and when the preceding vehicle is determined to be absent, the adaptive cruise control of accelerating and decelerating the own vehicle such that the speed of the own vehicle matches a predetermined target vehicle speed;
    lengthening, when the adaptive cruise control is started or when the adaptive cruise control is being executed in a case in which a vehicle height of the own vehicle is increased to be higher than a normal height by vehicle height adjustment, a target-inter-vehicle-distance-when-stopped, which is the predetermined target inter-vehicle distance of when the own vehicle is stopped, as compared with a case in which the vehicle height is the normal height;
    acquiring a vehicle height change amount, which is an amount of change in the vehicle height at a time of changing the vehicle height from the normal height by the vehicle height adjustment;
    when the vehicle height change amount at a time of increasing the vehicle height to be higher than the normal height is defined as a positive value, and the vehicle height change amount at a time of decreasing the vehicle height to be lower than the normal height is defined as a negative value, lengthening the target-inter-vehicle-distance-when-stopped as the vehicle height change amount increases; and
    executing the adaptive cruise control of accelerating and decelerating the own vehicle by controlling a driving force applied to a drive apparatus of the own vehicle and controlling a braking force applied to a braking apparatus of the own vehicle, such that the inter-vehicle distance to the preceding vehicle matches the target-inter-vehicle-distance-when-stopped.

7. A non-transitory computer-readable storage medium storing a driving support program for causing a computer to execute processing comprising:

- detecting a preceding vehicle present in front of an own vehicle and dividing lines extending in front of the own vehicle, and acquiring information on the preceding vehicle and the dividing lines as surrounding information;
- determining whether the preceding vehicle is present based on the surrounding information,
- executing, when the preceding vehicle is determined to be present, adaptive cruise control of accelerating and decelerating the own vehicle such that an inter-vehicle distance to the preceding vehicle matches a predetermined target inter-vehicle distance which becomes longer as a speed of the own vehicle increases,
- executing, and when the preceding vehicle is determined to be absent, the adaptive cruise control of accelerating and decelerating the own vehicle such that the speed of the own vehicle matches a predetermined target vehicle speed;
- lengthening, when the adaptive cruise control is started or when the adaptive cruise control is being executed in a case in which a vehicle height of the own vehicle is increased to be higher than a normal height by vehicle height adjustment, a target-inter-vehicle-distance-when-stopped, which is the predetermined target inter-vehicle distance of when the own vehicle is stopped, as compared with a case in which the vehicle height is the normal height;
- acquiring a vehicle height change amount, which is an amount of change in the vehicle height at a time of changing the vehicle height from the normal height by the vehicle height adjustment;
- when the vehicle height change amount at a time of increasing the vehicle height to be higher than the normal height is defined as a positive value, and the vehicle height change amount at a time of decreasing the vehicle height to be lower than the normal height is defined as a negative value, lengthening the target-inter-vehicle-distance-when-stopped as the vehicle height change amount increases; and
- executing the adaptive cruise control of accelerating and decelerating the own vehicle by controlling a driving force applied to a drive apparatus of the own vehicle and controlling a braking force applied to a braking apparatus of the own vehicle, such that the inter-vehicle distance to the preceding vehicle matches the target-inter-vehicle-distance-when-stopped.

* * * * *